340-870.13 SR

XR 3,943,488

[redacted]

United States [11] 3,943,488

Kazahaya [45] Mar. 9, 1976

[54] MULTIPLEX TELEMETERING SYSTEM

[75] Inventor: Masahiro Kazahaya, Warminster, Pa.

[73] Assignee: Fischer & Porter Co., Warminster, Pa.

[22] Filed: July 16, 1974

[21] Appl. No.: 488,950

[52] U.S. Cl. .............. 340/147 C; 340/183; 328/104

[51] Int. Cl.[2] ...................... H04Q 9/12; G08C 15/06

[58] Field of Search ..... 340/147 R, 147 C, 147 CN, 340/151, 183

[56] References Cited

UNITED STATES PATENTS

| | | | |
|---|---|---|---|
| 2,937,369 | 5/1960 | Newbold et al. | 340/147 CN |
| 3,045,210 | 7/1962 | Langley | 340/151 X |
| 3,059,228 | 10/1962 | Beck et al. | 340/183 UX |
| 3,539,928 | 11/1970 | Gardner et al. | 340/147 CN |
| 3,594,725 | 7/1971 | Clinard | 340/147 C |
| 3,633,165 | 1/1972 | Gilbert | 340/147 R |
| 3,683,415 | 8/1972 | Lloyd et al. | 340/147 C |
| 3,694,811 | 9/1972 | Wood | 340/152 R |
| 3,750,155 | 7/1973 | Oman | 340/183 |

*Primary Examiner*—Donald J. Yusko

[57] ABSTRACT

A multiplex telemetering system for transmitting a group of data signals each representing a distinct analog value, over a common channel to a receiving terminal where the data signals are fed into respective sub-channels. The transmitter includes a commutator formed by a series of individually actuatable switches which sequentially supply the data signals to the common channel. At the receiving terminal, the data signals are distributed by a corresponding commutator to the several sub-channels. In order to synchronize the operation of the commutators, an address generator at the receiving terminal cyclically produces a series of multi-bit binary values the number of values in the series equalling the number of switches in each commutator. The series of binary values generated are decoded to produce control voltages for sequentially actuating the receiver commutator switches, the binary values also being translated into an audio signal mixture composed of different frequencies representing the bits of the binary code. The signal mixture produced at the receiving terminal is conveyed over the common channel to the transmitter, the mixture being superimposed on the data signals. The signal mixture is intercepted at the transmitter and the frequencies thereof segregated from each other and restored to a series of binary values which are decoded to produce control voltages for synchronously actuating the transmitter commutator switches.

9 Claims, 2 Drawing Figures

3943488

MULTIPLEX TELEMETERING SYSTEM

BACKGROUND OF THE INVENTION

Figure 1:
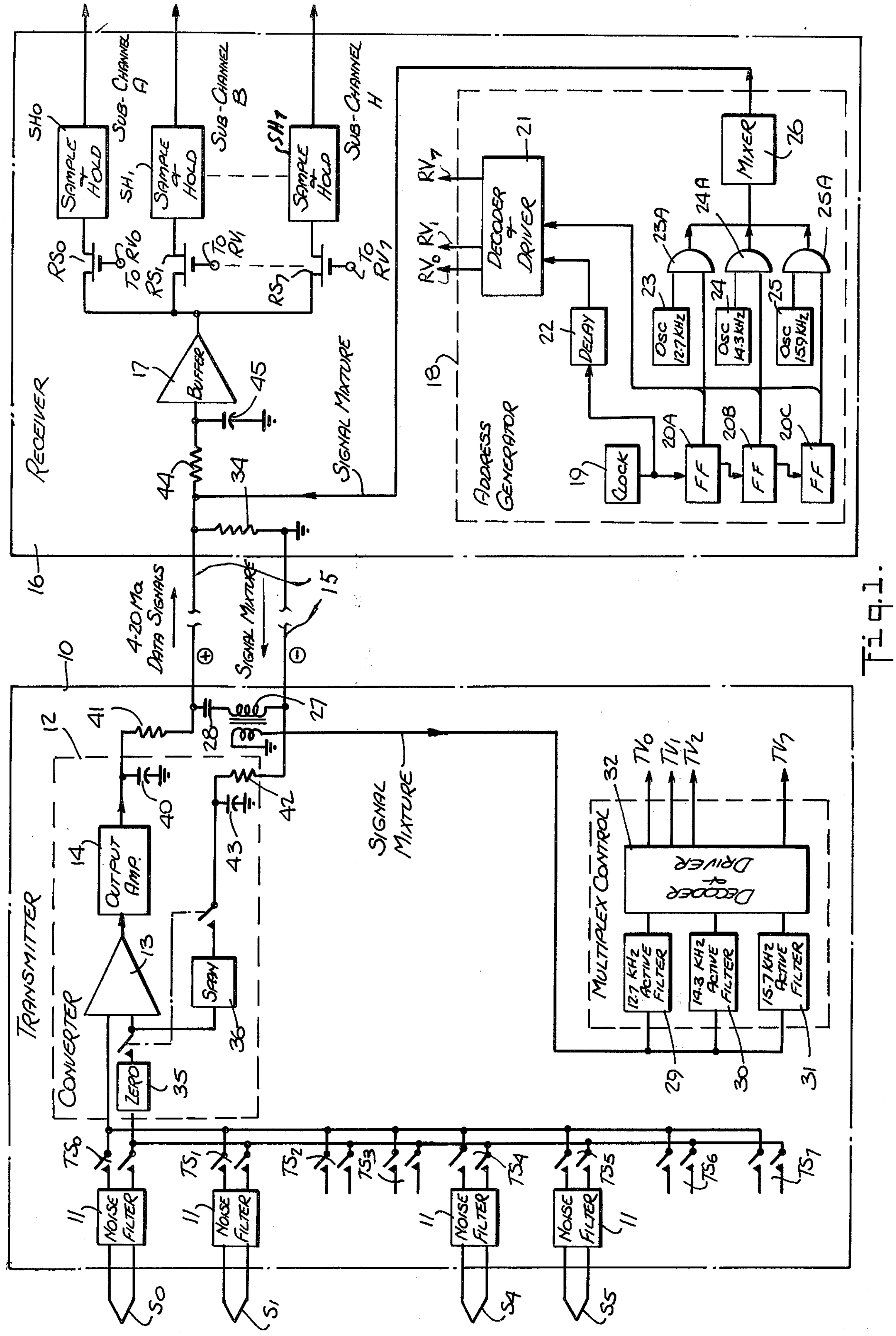

This invention relates generally to telemetering systems of the multiplexing type adapted to transmit data derived from a group of sources to a remote receiving terminal, and more particularly to a low-cost and efficient system for transmitting process control data.

In industrial process control, it is necessary to transmit data obtained at various points or stations in the process to a remote indicating or control terminal. The data to be conveyed from the field stations to the receiving terminal may be changes in pressure, temperature, flow rate or any other process variable. In most cases, this data is derived by means of analog sensors which convert the sensed process variables into corresponding electrical analog signals.

A telemetering system in which the output of each sensor is fed to the remote terminal over a separate wire line is not feasible when the distance between the sensors and the terminal is long and many sensors are involved. The large number of lines entained by the telemetering system and their length may make the system prohibitively expensive.

Multiplexing techniques are known which act to sequentially transmit digital values derived from continuous or analog data to a remote terminal over a single main channel, thereby avoiding the need for as many telemetering lines as there are sensors. Multiplex systems for analog information usually use frequency division to transmit this information, the several input signals being each modulated onto a subcarrier and the combined for transmission.

Also in use are time-division multiplexing systems which employ a commutator (electronic or mechanical) at the transmitting station to sample each data source in sequence. The samples transmitted over the main channel are separated at the remote terminal into appropriate sub-channels by means of a similar commutator which runs in synchronism with the transmitter commutator. Existing time-division multiplexing systems capable of operating reliably to transmit signals in their proper sequence and without overlap are typically of the digital type and are relatively complex and expensive. They add substantially to construction and operating costs in process control installations.

In a typical digital multiplexing system, the transmitter includes a transmitter commutator, an address generator, an analog-to-digital converter and a transmission controller. Each input signal selected by the commutator under the control of the address generator is converted by the code converted to a binary data signal. The address and data signals are combined into one digital word to which is added some error detection bits by the code converter. These combined signals are sent out by the transmission controller to a common channel in a serial manner. For this purpose a wide channel bandwidth is required, making the common channel expensive to install. Moreover the broad bandwidth common channel has a high degree of noise-sensitivity.

At the receiver, the serial data is received by an input register which converts the serial data to its parallel format for further processing. Besides the input register, the receiver includes an address register, a digital-to-analog converter, an error detector, a verification circuit and a receiving commutator. When data is received, the error detector checks to see if any error has occurred in the course of data transmission. If no error is detected, the verification circuit sends back a verification signal to the transmitter. Should an error be detected, then the verification circuit requests the transmitter to again send the same data. The address component of the received data is fed to the address register which controls the receiver commutator, the data component being fed to the digital-to-analog converted to change back into analog form.

SUMMARY OF THE INVENTION

In view of the foregoing, it is the main object of this invention to provide a simple, low-cost multiplex telemetering system which operates efficiently and reliably to transmit a group of data signals to separate sub-channels at a remote receiving terminal, the signals being conveyed over a common channel.

More particularly, it is an object of the invention to provide a telemetering system of the above-type wherein the data signals are in analog form and are derived from process variable sensors at a field station, the signals being transmitted to a remote terminal where the received signals are indicated or serve to carry out process control functions.

A significant feature of the invention is that the process variable data is converted into standard process control DC signals (i.e.; 4–20 mAdc), the analog data being sampled by a time-division technique whereby received in each sub-channel at the receiving terminal are periodic signal samples which are held to produce a continuous output. An important advantage of the present invention as compared to the typical system, is that it is of far simpler and less expensive construction, for it eliminates complex circuits such as an analog-to-digital converter, a code converter, and an error verification circuit.

Also an object of this invention is to provide a multiplex system operating on the time-division principle and making use of commutators at the receiving and transmitting terminals which are maintained in synchronous operation whereby each data-signal at the transmitter is supplied to its proper sub-channel at the receiver. A salient aspect of the invention resides in the fact that should any switch in a commutator fail to operate, this will only act to momentarily cut-out the data signal related to that switch and in no way effect the signal distribution in that the next operative signal in the sequence will be fed into its proper sub-channel.

Briefly stated, these objects are attained in a multiplex telemetering system in which a group of data signals each representing a distinct value is conveyed by time-division over a common channel to a remote receiving terminal where the data signals are fed into separate sub-channels appropriate thereto.

Included in the transmitter is a commutator formed by a series of individually-actuatable switches which sequentially supply the data signals in the group to the common channel, the received signals being distributed by a corresponding commutator to the respective sub-channels.

In order to synchronize the commutators, an address generator at the receiving terminal cyclically produces a series of multiple-bit binary values, the number of values in the series equalling the number of switches in each commutator. The series of binary values generated at the receiving terminal are decoded to produce control voltages for individually actuating the switches in the receiver commutator in sequence, the binary values also being translated into a signal mixture of different frequencies representing the bits of the binary code.

This signal mixture is sent from the receiving terminal over the common channel to the transmitter where the signal mixture which is superimposed over the data signals is separated therefrom and the frequencies of the mixture are segregated from each other. The segregated frequencies are restored to a series of binary values which are decoded to produce control voltages for synchronously actuating the transmitter commutator switches.

In the above-described embodiment, the address generator and the related circuits are located at the receiver and the multiplex control and the circuits related thereto in the transmitter. However in some applications, the address generator may be in the transmitter with the multiplex control being in the receiver.

OUTLINE OF THE DRAWINGS

Figure 2:
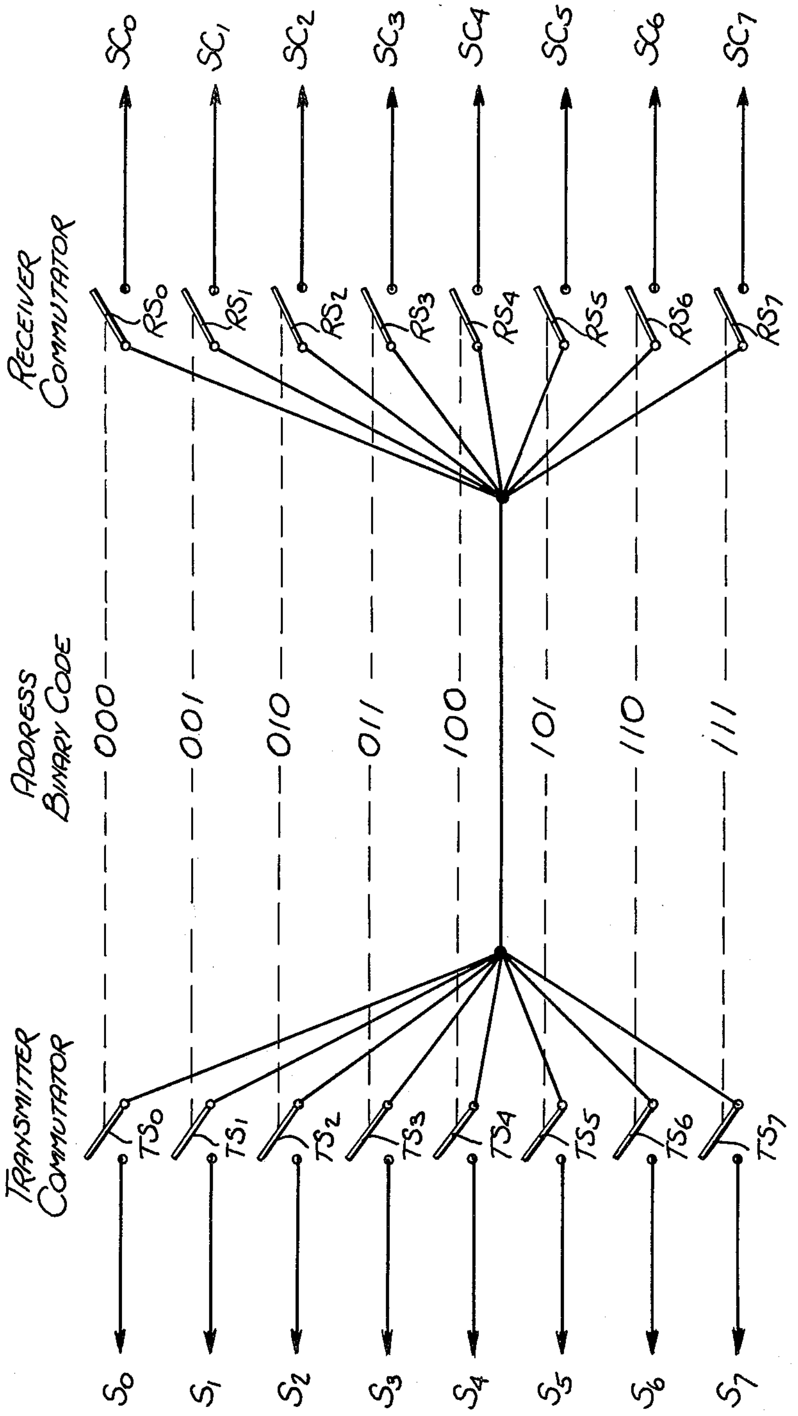

For a better understanding of the invention as well as other objects and features thereof, reference is made to the following detailed description to be read in conjunction with the accompanying drawing wherein:

FIG. 1 is a block diagram of a multiplex telemetering system in accordance with the invention; and FIG. 2 is a diagram explanatory of the principles underlying the invention.

DESCRIPTION OF THE INVENTION

Referring now to FIG. 1, there is shown a multiplexing telemetering system for transmitting data from a group of sensors at a field station over a common channel to a remote terminal. While the invention is not limited to the transmission of process control data, by way of illustration it will be described in connection therewith.

In process control systems, certain process variables are converted into equivalent electrical signals which are conveyed to read-out devices. Or the signals serve to control the operation of a final control element governing the process variable. Thus fluctuations in temperature may be sensed by a thermocouple whose voltage value reflects the temperature prevailing in a process pipe line or tank. This change in voltage as a function of a process variable is then converted into a current signal by means of a voltage-to-current converter. In process control engineering, the usual practice is to operate with current signals at the 4 to 20 ma range.

The present invention is not limited to any particular form of analog signal input, or to any given number of inputs. But by way of example, the system illustrated herein is adapted to transmit over a single channel a group of eight analog data signals developed by sensors $S_0$, $S_1$, $S_2$, $S_3$, $S_4$, $S_5$, $S_6$ and $S_7$ which may be thermocouple devices.

At the transmitter, generally designated by numeral 10, the analog data signals are sequentially sampled by means of a commutator constituted by eight individually actuatable switches $TS_0$ to $TS_7$. Each sensor $S_0$ to $S_7$ is coupled through a suitable noise filter 11 and its correspondingly-numbered commutator switch ($TS_0$ to $TS_7$) to a converter 12.

This circuit includes an amplifier 13 to amplify the data signal to a high signal level, which signal is amplified in an output amplifier stage 14 whose current output (4–20 mA) is applied to a common two-wire channel 15 leading to a remote receiving terminal generally designated by numeral 16.

The path of output current is such that it comes out of amplifier 14 to the plus side of channel 15 through a filter consisting of capacitor 40 and resistor 41, and it passes through a receiver input resistor 34 (250Ω, typical), generating the input voltage (1–5V typical) for the receiver. The return to the transmitter is through the negative side of channel 15. The return current, as will be later explained, serves as a negative feedback signal.

Thus all of the transmitter commutator switches $TS_0$ to $TS_7$ are connected in parallel relation, and since these switches are actuated in sequence, data samples derived from sensors $S_0$ to $S_7$ are successively applied to the input of converter 12.

The data signals conveyed over the common channel 15 are applied at the remote receiving terminal 16 to a buffer amplifier 17 whose output is coupled to a receiver commutator composed of eight individually actuatable switches $RS_0$ to $RS_7$. Switch $RS_0$ connects the output of the buffer to an analog sub-channel A through an analog sample-and-hold circuit $SH_0$, while switch $RS_1$ connects the output of the buffer through a sample-and-hold circuit $SH_1$ to an analog sub-channel B. Similarly, switches $RS_2$ to $RS_7$ respectively connect the output of the buffer through sample-and-hold circuits $SH_2$ to $SH_7$ to sub-channels C, D, E, F, G and H.

Thus, assuming synchronous operation of the transmitter and receiver commutator switches, the data samples obtained sequentially from sensors $S_0$ to $S_7$ are fed in the same sequence to sub-channels A to H. Each sample-and-hold circuit acts to convert the current data sample into a corresponding voltage whose amplitude is maintained for a period sufficient to avoid a gap between successively-received samples, thereby producing a continuous rather than an intermittent output voltage. A suitable analog hold circuit for this purpose is disclosed in the Azegami U.S. Pat. No. 3,784,919.

In order to insure synchrous operation of the receiver and transmitter commutators, the receiving station is provided with an address generator, generally designated by numeral 18, which produces sub-channel selection or address signals in the form of binary numbers.

In address generator 18, a clock 19 produces periodic pulses at a constant repetition rate depending on the number of sub-channels in the system. Since the system disclosed herein has eight data signals which are to be received in eight subchannels, an appropriate clock repetition is $8H_z$, so that a pulse is generated every one-eighth of a second.

The clock pulses are applied to a three-bit counter formed by flip-flop stages 20A, 20B and 20C connected in counter arrangement. The three stages yield a series of eight binary values derived from a three-bit binary code, namely binary 000, 001, 010, 011, 100, 101, 110 and 111. It will be appreciated that the number of bits depends on the number of sub-channels in the system, so that for a 16 sub-channel multiplex system, a 4-bit code is appropriate to produce a series of 16 binary values, whereas for a 32 sub-channel system, one needs a 5-bit code.

The output of clock 19 is applied to a decoder 21 through a delay circuit 22, while the outputs of counter stage 20A, 20B and 20C are applied to the decoder to generate a series of control voltages $RV_0$ to $RV_7$ which are applied to commutator switches $RS_0$ to $RS_7$ to actuate same. These switches may be in electronic or electro-mechanical form, so that in the case of electromagnetically-actuated switches the control voltages are applied to the solenoids of the switches, whereas in the case of solid state switches the control voltages are applied to the gate electrodes thereof. The transmitter commutator switches may also be in an appropriate solid state or electro-mechanical form.

In order to provide corresponding control voltages in the transmitter to synchronize the operation of the transmitter commutator with the receiver commutator, three audio frequency oscillators 23, 24 and 25 are provided, producing distinct frequencies (i.e., 12.7KH$_z$, 14.3H$_z$ and 15.7H$_z$). The outputs of these audio oscillators are applied to a mixer 26 through respective gates 23A, 24A and 25A which are enabled only when the counter bits from counter stages 20A, 20B and 20C are binary 1.

Thus when the binary value is 010, only the output of the 14.3KH$_z$ oscillator 24 appears in mixer 26, but when the binary value is 101, the outputs of both the 12.7KH$_z$ oscillator 23 and the 15.7KH$_z$ oscillator are fed to the mixer. Thus the frequency composition of the signal mixture reflects the binary number produced by the counter stages.

This audio signal mixture is applied at receiver resistor terminal 34 to common channel 15 which conveys it to the transmitter where it is separated from the DC data signal being conveyed by means of a transformer 27 whose primary is connected to the channel through a DC blocking capacitor 28, so that only the audio signal mixture is yielded by the secondary of the transformer. On the other hand, the filter (elements 44–45) prevents the audio signal from going into buffer amplifier 17.

The output of the transformer secondary is applied to a multiplex control circuit which includes a set of three active filters 29, 30, 31 tuned respectively to 12.7KH$_z$, 14.3KH$_z$ and 15.7KH$_z$, so that each filter yields an output representing binary 1 only when an audio signal of the assigned frequency appears in the applied frequency mixture.

Hence the set of active filters acts to recreate the series of eight binary values in the 3-bit binary code developed by address generator 18 at the receiving terminal. These binary values are applied to a decoder 32 producing control voltages $TV_0$ to $TV_7$. These control voltages appear sequentially in synchronism with control voltages $RV_0$ to $RV_7$ in the receiving terminal and are applied to transmitter commutator switches $TS_0$ to $TS_7$, whereby both commutators operate in exact synchronism. Although voltages $TV_0$ to $TV_7$ are in synchronism with voltages $RV_0$ to $RV_7$, the starting time of voltages $RV_0$ to $RV_7$ are deferred by delay circuit 22 to avoid the transient effects of the switches.

It will be appreciated that should the transmitter multiplex control circuit momentarily fail to receive or respond to the audio frequency mixture as a result of noise on the line or any other factor, its effect will only be on the particular transmitter commutator switch actuated by the absent frequency mixture, and it will not alter the sequence of switch operation. Each switch responds to its own binary number, without regard to whether any other switch is actuated.

Thus as shown in FIG. 2, the transmitter and receiver commutator switches $TS_0$ and $RS_0$ are simultaneously actuated only when binary number 000 appears, switches $TS_1$ and $RS_1$ are simultaneously actuated only when binary number 001 appears, and so on with respect to the other switch pairs. Since the series of binary numbers are produced at eight intervals per second, each data signal from sensors $S_0$ to $S_7$ is sampled for one-eighth of a second in the course of every operating cycle.

For purposes of maintaining the amplitude of the signal on the common channel 15 at a level proportional to the data signal input amplitude despite distortion introduced by the channel, a negative feedback arrangement is provided. The return current of the analog data signals is applied through filter 42 and 43 to a feedback resistor in the span circuit 36, the resultant feedback voltage is proportional to the voltage established across resistor 34 as the same current is applied to both resistors, and is fed back into an input of amplifier 13 to compensate for any variation in DC signal amplitude. The special processor at the transmitter terminal also includes a zero-setting stage 35 and a span-adjusting stage 36 as is usual in process control systems.

While there has been shown and described preferred embodiments in accordance with the invention, it will be appreciated that many changes and modifications may be made therein without, however, departing from the essential spirit thereof.

I claim:

1. A multiplex telemetering system for transmitting a group of electrical data signals, each representing a distinct analog value, over a common channel to a remote receiving terminal, said system comprising:

A. a transmitter including a commutator formed by a series of individually actuatable switches for sequentially supplying said analog data signals to said common channel;

B. a receiving terminal including a commutator sequentially distributing the analog data signals received from said common channel to separate sub-channels, the commutator having a like series of switches, and C. apparatus synchronizing the operation of the transmitter and receiver commutators and including an address generator disposed at the receiving terminal to cyclically produce a series of multi-bit code values, the number of values in the series thereof being equal the number of switches in each commutator, means to decode said series of code values to produce a series of control voltages sequentially actuating said receiver commutator switches, means to translate each value in said series of code values into a distinctive audio signal mixture composed of different frequencies representing the bits of said code, each frequency in the signal mixture representing a respective bit in the multi-bit code, means at the receiving terminal to superimpose said signal mixture on the analog data signals in said common channel, means at the transmitter to intercept said signal mixture and to segregate the frequencies thereof from each other, means responsive to said segregated frequencies to restore them to the series of code values, and means to decode the restored code values to produce control voltages synchronously actuating the transmitter commutator switches.

2. A system as set forth in claim 1, wherein said data signals are derived from sensors responsive to process variables, and said remote terminal sub-channels are coupled to process control means.

3. A system as set forth in claim 1, wherein at least one of said commutators is composed of switches which are solid-state devices having gate electrodes to which said control voltages are applied.

4. A system as set forth in claim 1, wherein said transmitter includes a converter to convert the sensor signals to DC currents proportional thereto.

5. A system as set forth in claim 4, further including means to develop a negative feedback voltage which depends on the amplitude of the signals received at the remote terminal and to feed said feedback voltage to said converter to compensate for distortions in signal amplitude arising in said channel.

6. A system as set forth in claim 1, wherein each of said receiver commutator switches is coupled to a sample-and-hold circuit adapted to hold the signal samples for an interval sufficient to convert the sample into a continuous voltage.

7. A system as set forth in claim 1, wherein said address generator is constituted by a clock producing pulses, and a multi-state binary counter coupled to the output of said clock to produce said series of values.

8. A system as set forth in claim 7, wherein said means to translate said series of values into a signal mixture includes a set of audio-frequency oscillators producing frequencies each representing one bit of the code, the outputs of said oscillators being fed to a mixer through gates which are activated by the stages of said counter.

9. A system as set forth in claim 8, wherein said means to segregate the frequencies of the mixture from each other is constituted by a set of active filters each tuned to one of said frequencies.

* * * * *

UNITED STATES PATENT OFFICE
CERTIFICATE OF CORRECTION

PATENT NO. : 3,943,488

DATED : March 9, 1976

INVENTOR(S) : Masahiro Kazahaya

It is certified that error appears in the above-identified patent and that said Letters Patent are hereby corrected as shown below:

Column 1, line 23 "entained" should have read -- entailed --

Column 1, line 33 "the" should have read -- then --

Column 2, line 10 "converted" should have read -- converter --

Column 6, line 18 "special" should have read -- signal --

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*